United States Patent
Ha (10) Patent No.: US 9,847,656 B2
(45) Date of Patent: Dec. 19, 2017

(54) ENERGY STORAGE SYSTEM AND METHOD FOR DRIVING THE SAME

(71) Applicant: SAMSUNG SDI CO., LTD., Yongin-si, Gyeonggi-do (KR)

(72) Inventor: Sang-Min Ha, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 222 days.

(21) Appl. No.: 14/617,744

(22) Filed: Feb. 9, 2015

(65) Prior Publication Data
US 2015/0229145 A1    Aug. 13, 2015

(30) Foreign Application Priority Data

Feb. 11, 2014   (KR) .................. 10-2014-0015655

(51) Int. Cl.
*H02J 7/00* (2006.01)
*H02J 7/04* (2006.01)

(52) U.S. Cl.
CPC .......... *H02J 7/0021* (2013.01); *H02J 7/0016* (2013.01); *H02J 7/007* (2013.01); *H02J 7/0018* (2013.01); *H02J 7/0019* (2013.01); *H02J 7/0022* (2013.01); *H02J 2007/005* (2013.01)

(58) Field of Classification Search
USPC ........ 320/134, 118, 132, 136, 116, 162, 119, 320/122, 126, 128, 135, 149, 124, 133
See application file for complete search history.

(56) References Cited

U.S. PATENT DOCUMENTS

| | | | |
|---|---|---|---|
| 2003/0030442 A1* | 2/2003 | Sugimoto | G01R 31/3658 324/429 |
| 2007/0145949 A1* | 6/2007 | Matsushima | H02J 7/00 320/132 |
| 2007/0170891 A1* | 7/2007 | Matveishen | H02J 1/14 320/132 |
| 2009/0091332 A1* | 4/2009 | Emori | B60L 11/1855 324/537 |
| 2012/0025769 A1* | 2/2012 | Kikuchi | B60L 3/0046 320/118 |

(Continued)

FOREIGN PATENT DOCUMENTS

| KR | 1998-077643 | 11/1998 |
|---|---|---|
| KR | 10-2004-0108295 | 12/2004 |

*Primary Examiner* — Alexis Pacheco
(74) *Attorney, Agent, or Firm* — Lewis Roca Rothgerber Christie LLP (57) ABSTRACT

There are provided an energy storage system and a method for driving the energy storage system, which can exactly measure discharge current by calculating measurement times of the discharge current according to the frequency of the discharge current. An energy storage system includes a battery rack, a battery management system configured to control charging and discharging of the battery rack, and a power conversion system configured to supply discharge current of the battery rack as an alternating current having a frequency to the battery management system. The battery management system is further configured to calculate measurement times of the discharge current, measure the discharge current at the calculated measurement times, and control the charging and discharging of the battery rack based on the measured discharge currents.

16 Claims, 5 Drawing Sheets

(56) References Cited

U.S. PATENT DOCUMENTS

| | | | |
|---|---|---|---|
| 2012/0194139 A1* | 8/2012 | Sasaki | H01M 10/0525 320/126 |
| 2013/0063095 A1* | 3/2013 | Watanabe | H02J 7/0078 320/134 |
| 2013/0069598 A1* | 3/2013 | Tanaka | H01M 10/0525 320/134 |
| 2013/0275783 A1* | 10/2013 | Liu | G01R 31/3606 713/310 |
| 2013/0278221 A1* | 10/2013 | Maeda | B60L 3/0046 320/134 |
| 2014/0167657 A1* | 6/2014 | Nishikawa | H01M 10/441 318/139 |
| 2014/0184165 A1* | 7/2014 | Takahashi | H01M 10/486 320/134 |
| 2014/0239908 A1* | 8/2014 | Ichikawa | H02J 7/0016 320/134 |
| 2015/0054466 A1* | 2/2015 | Kinomura | B60L 11/1816 320/134 |

* cited by examiner

ENERGY STORAGE SYSTEM AND METHOD FOR DRIVING THE SAME

CROSS-REFERENCE TO RELATED APPLICATION

This application claims priority to and the benefit of Korean Patent Application No. 10-2014-0015655, filed on Feb. 11, 2014 in the Korean Intellectual Property Office, the entire content of which in incorporated herein by reference.

BACKGROUND

1. Field

Aspects of embodiments of the present invention relate to an energy storage system and a method for driving the same.

2. Description of the Related Art

As environmental disruption, resource depletion, etc., are problematic, interest in a system capable of storing energy and efficiently using the stored energy is increasing. In addition to the system, the importance of renewable energy is increasing. Here, the renewable energy does not cause or hardly causes pollution in a power generation process. An energy storage system is a system that couples renewable energy, a battery system for storing power, and existing grids. The energy storage system stores power produced from the renewable energy in a battery system, and the power stored in the battery system is supplied to a load when the power of a grid is insufficient.

The energy storage system includes a battery system and a power conversion system. The battery system includes a battery and a battery management system. The power conversion system controls the power supply of the renewable energy, the battery system, and the grid.

More specifically, the power conversion system supplies alternating discharge current of the battery and having a predetermined frequency to the battery management system. The battery management system measures the discharge current of the battery, input from the power conversion system, and calculates state of charge (SOC) and state of health (SOH) of the battery using the measured current value. The battery management system outputs, to the power conversion system, data including information on the SOC and SOH of the battery, and the power conversion system charges and discharges the battery based on the SOC and SOH information.

Figure 1:
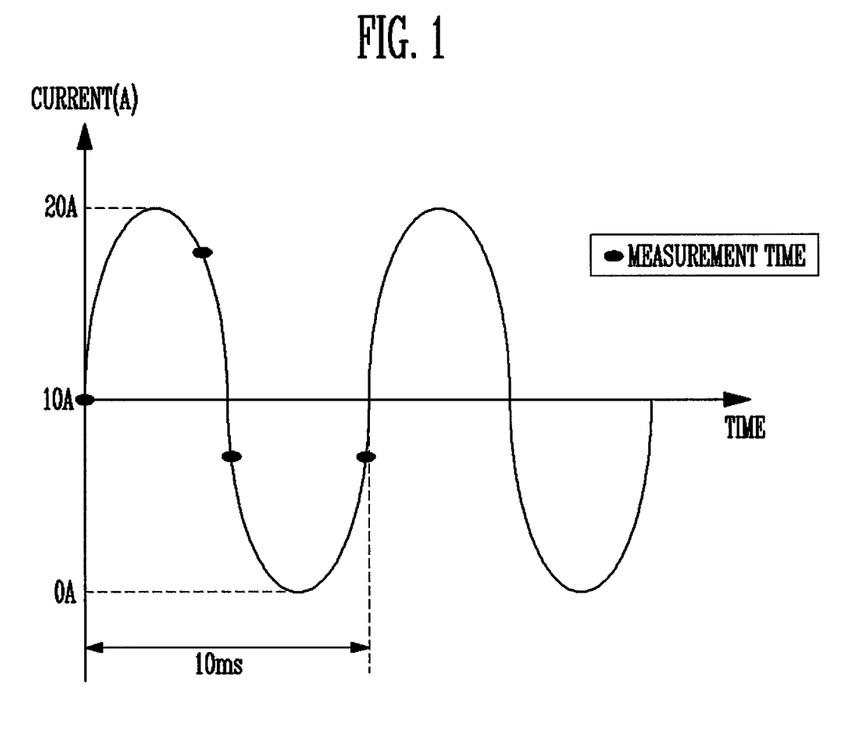
FIG. 1 is a waveform diagram showing measurement times of alternating discharge current generated at a predetermined frequency according to the related art.

FIG. 1 is a waveform diagram showing measurement times of alternating discharge current generated with a predetermined frequency according to the related art. Referring to FIG. 1, the battery management system receives the alternating discharge current of the battery, generated at a predetermined frequency, from the power conversion system. In FIG. 1, it has been illustrated that the frequency of the discharge current is 100 Hz (hertz); that is, the cycle of the alternating discharge current is 10 ms (milliseconds).

The related art battery management system measures discharge current at predetermined measurement times, such as regular intervals. For example, the related art battery management system measures discharge current every 3 ms (starting from the left) as shown in FIG. 1. The alternating discharge current shown in FIG. 1 is 10 A (amperes), but the discharge current measured by the battery management system is calculated as (10 A+17 A+8 A+8 A)/4=10.75 A. That is, there is a problem in that a deviation or error occurs in the discharge current measured by the related art battery management system. Accordingly, in order to prevent such a measurement error of the discharge current, related art methods such as measuring a frequency of the alternating discharge current of the power conversion system and then directly setting measurement times of discharge current of the battery management system are used.

SUMMARY

Embodiments of the present invention provide for an energy storage system and a method for driving the same, which can exactly measure alternating discharge current by calculating measurement times of the discharge current according to the frequency of the discharge current.

According to an embodiment of the present invention, an energy storage system is provided. The energy storage system includes a battery rack, a battery management system configured to control charging and discharging of the battery rack, and a power conversion system configured to supply discharge current of the battery rack as an alternating current having a frequency to the battery management system. The battery management system is further configured to calculate measurement times of the discharge current, measure the discharge current at the calculated measurement times, and control the charging and discharging of the battery rack based on the measured discharge currents.

The battery management system may be further configured to store an initial sampling time as a first time, and decide whether the discharge current of the battery rack is increasing or decreasing right after the first time.

When the discharge current of the battery rack is increasing right after the first time, the battery management system may be further configured to store an initial time when the discharge current has a maximum value after the first time as a second time, store an initial time when the discharge current has a minimum value after the second time as a third time, and store an initial time after the third time, when the discharge current has a value no less than the discharge current measured at the first time, as a fourth time.

The battery management system may be further configured to calculate a length from the first time to the fourth time as one period length of the discharge current, and calculate the measurement times of the discharge current using the first to fourth times and the one period length.

When the discharge current of the battery rack is decreasing right after the first time, the battery management system may be further configured to store an initial time when the discharge current has a minimum value after the first time as a second time, store an initial time when the discharge current has a maximum value after the second time as a third time, and store an initial time after the third time, when the discharge current has a value no more than the discharge current measured at the first time, as a fourth time.

The battery management system may be further configured to calculate a length from the first time to the fourth time as one period length of the discharge current, and calculate the measurement times of the discharge current using the first to fourth times and the one period length.

The battery management system may be further configured to calculate state of charge (SOC) and state of health (SOH) information of the battery rack using the measured discharge currents, generate control signals or control data based on the calculated SOC and SOH information of the battery rack, and supply the generated control signals or control data to the power conversion system.

The power conversion system may be further configured to charge and discharge the battery rack based on the supplied control signals or control data.

According to another embodiment of the present invention, a method for driving an energy storage system is provided. The method includes supplying discharge current of a battery rack as an alternating current having a frequency, and controlling charging and discharging of the battery rack depending on the discharge current. The controlling of the charging and discharging of the battery rack depending on the discharge current includes calculating measurement times of the discharge current, measuring the discharge current at the measurement times, and controlling the charging and discharging of the battery rack based on the measured discharge currents.

The calculating of the measurement times of the discharge current may include storing an initial sampling time of the discharge current as a first time, and deciding whether the discharge current of the battery rack is increasing or decreasing right after the first time.

When discharge current is increasing right after the first time, the calculating of the measurement times of the discharge current may further include storing an initial time when the discharge current has a maximum value after the first time as a second time, storing an initial time when the discharge current has a minimum value after the second time as a third time, and storing an initial time after the third time, when the discharge current has a value no less than the discharge current measured at the first time, as a fourth time.

The calculating of the measurement times of the discharge current may further include calculating a length from the first time to the fourth time as one period length of the discharge current, and calculating the measurement times of the discharge current using the first to fourth times and the one period length.

When the discharge current is decreasing right after the first time, the calculating of the measurement times of the discharge current may further include storing an initial time when the discharge current has a minimum value after the first time as a second time, storing an initial time when the discharge current has a maximum value after the second time as a third time, and storing an initial time after the third time, when the discharge current has a value no more than the discharge current measured at the first time, as a fourth time.

The calculating of the measurement times of the discharge current may further include calculating a length from the first time to the fourth time as one period length of the discharge current, and calculating the measurement times of the discharge current using the first to fourth times and the one period length.

The controlling of the charging and discharging of the battery rack based on the measured discharge currents may include calculating state of charge (SOC) and state of health (SOH) information of the battery rack using the measured discharge currents, generating control signals or control data based on the calculated SOC and SOH information of the battery rack, and supplying the generated control signals or control data to a power conversion system.

The supplying of the discharge current of the battery rack may include charging and discharging the battery rack based on the supplied control signals or control data.

According to aspects of the present invention, current measurement times are calculated by analyzing (for example, using frequent sampling) the alternating discharge current of a battery rack, and the discharge current of the battery rack is then measured (for example, regularly measured) at the calculated current measurement times. As a result, when the alternating discharge current of the battery rack is generated at a fixed or predetermined frequency, it is possible to exactly measure the alternating discharge current having the frequency. Accordingly, in embodiments of the present invention, it is possible to exactly (or more precisely) calculate the SOC and SOH of the battery rack, thereby efficiently controlling the charging and discharging of the battery rack.

BRIEF DESCRIPTION OF THE DRAWINGS

Example embodiments will now be described more fully hereinafter with reference to the accompanying drawings; however, the present invention may be embodied in different forms and should not be construed as limited to the embodiments set forth herein. Rather, these embodiments are provided to more fully convey the scope of the present invention to those skilled in the art.

In the drawings, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Hereinafter, like reference numerals refer to like elements.

Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

Figure 2:
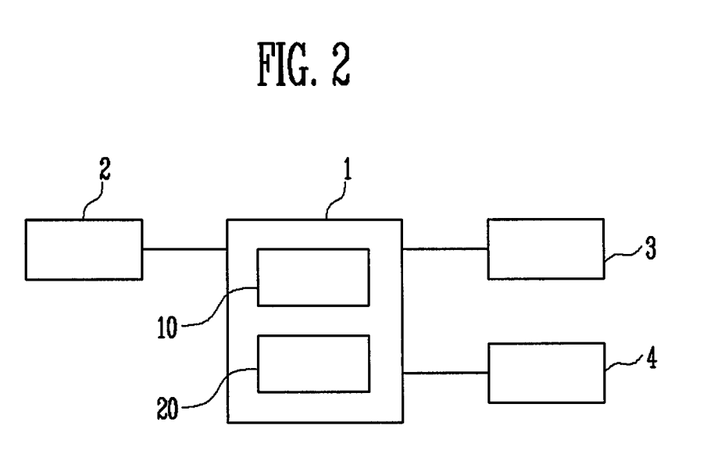
FIG. 2 is a block diagram schematically illustrating an energy storage system and peripheral components thereof according to an embodiment of the present invention.

FIG. 2 is a block diagram schematically illustrating an energy storage system 1 and peripheral components thereof according to an embodiment of the present invention.

Referring to FIG. 2, the energy storage system 1 supplies power to a load 4 in connection with a power generation system 2 and a grid 3. The energy storage system 1 includes a power conversion system 10 and a battery system 20. The power conversion system 10 controls the power supply of the battery system 20, the power generation system 2, and the grid 3. The power conversion system 10 supplies power received from the power generation system 2, the grid 3, and the battery system 20 into a suitable form for the grid 3, the load 4, and the battery system 20.

The power conversion system 10 may store power generated from the power generation system 2 in the battery system 20. The power conversion system 10 may supply the power generated from the power generation system 2 to the grid 3, and store the power supplied from the grid 3 in the battery system 20.

When the grid 3 is normally operating, the power conversion system 10 supplies the power supplied from the grid 3 to the load 4 and/or the battery system 20. When the grid 3 is abnormally operating, e.g., when a power failure occurs in the grid 3, the power conversion system 10 may supply power to the load 4 by performing an uninterruptible power supply (UPS) operation. Even when the grid 3 is normally operating, the power conversion system 10 may supply, to the load 4, power generated by the power generation system 2 or power stored in the battery system 20.

The power generation system 2 is a system that generates power using an energy source. The power generation system 2 supplies the generated power to the energy storage system 1. The power generation system 2 may be a power generation system for generating power using renewable energy. For example, the power generation system 2 may be a solar power generation system, a wind power generation system, or a tidal power generation system, but the present invention is not limited thereto.

Solar cells may be used for solar power generation systems for generating power using sunlight, and may be easily installed in houses, factories, or the like, and thus, solar cells may supply power to the energy storage system 1 as distributed in houses and factories. The power generation system 2 may be configured with a high-capacity energy system that includes a plurality of power generation modules connected in parallel and that generates power using each power generation module.

The grid 3 may include a power plant, a substation, power lines, and the like. When the grid 3 is normally operating, the grid 3 supplies power to the energy storage system 1 and receives power from the energy storage system 1. When the grid 3 is abnormally operating, the grid 3 does not supply power to the energy storage system 1, and the energy storage system 1 does not supply power to the grid 3.

The load 4 consumes power generated by the power generation system 2, power stored in the battery system 20, or power supplied from the grid 3. A house, a factory, or the like may be included in the load 4.

Figure 3:
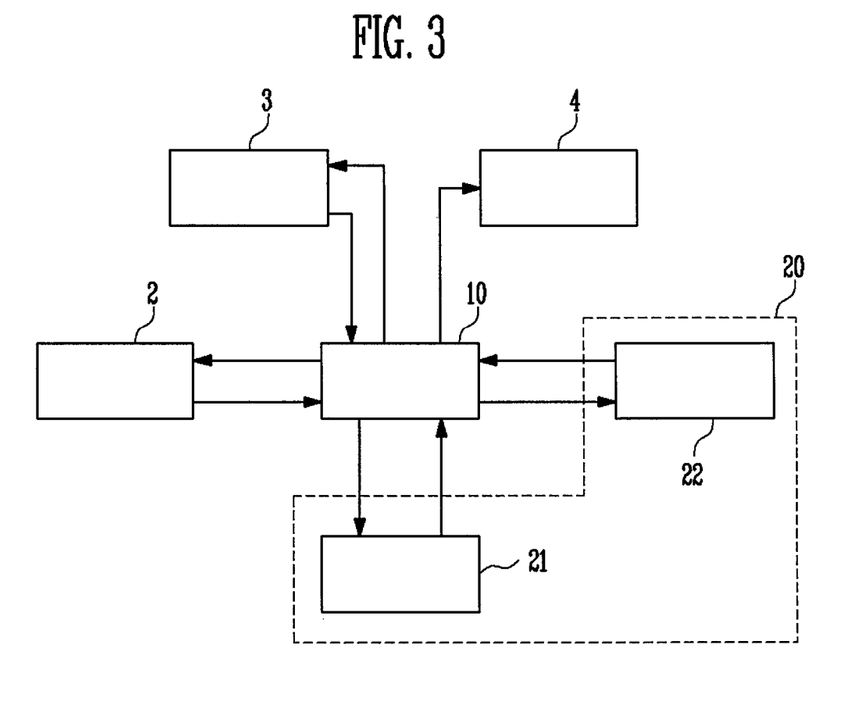
FIG. 3 is a block diagram illustrating in further detail the energy storage system and peripheral components thereof shown in FIG. 2.

FIG. 3 is a block diagram illustrating in further detail the energy storage system 1 and the peripheral components thereof shown in FIG. 2.

Referring to FIG. 3, the battery system 20 includes a battery rack 21 and a battery management system 22. The battery rack 21 stores power supplied from the power generation system 2 and/or the grid 3 through the power conversion system 10. The battery rack 21 supplies the power stored therein to the power generation system 2, the grid 3, and/or the load 4 through the power conversion system 10.

The battery rack 21 may include one or more battery trays connected in series and/or in parallel. Each battery tray may include a plurality of battery cells. Each battery cell may be implemented with one of various secondary batteries. For example, the battery cells may be implemented with any one or more of a nickel-cadmium battery, a lead acid battery, a nickel metal hydride (NiMH) battery, a lithium ion battery, or a lithium polymer battery.

The battery management system 22 controls charging and discharging of the battery rack 21. The battery management system 22 may perform various functions of overcharge prevention, overdischarge prevention, overcurrent prevention, overvoltage prevention, overheat prevention, cell balancing, and the like. The battery management system 22 may receive discharge current of the battery rack 21 through the power conversion system 10 in order to perform the overcharge prevention, overdischarge prevention, and the like, of the battery rack 21, and control the charging and discharging of the battery rack 21 according to the discharge current of the battery rack 21.

A method of controlling the charging and discharging of the battery rack 21 of the battery management system 22 will be described later in conjunction with FIG. 4. The battery management system 22 may receive temperature information from the battery rack 21 in order to prevent the overheat of the battery rack 21, and control the charging and discharging of the battery rack 21.

The battery management system 22 may supply set or predetermined control signals or control data to the power conversion system 10 in order to control the charging and discharging of the battery rack 21. The power conversion system 10 receives the control signals or control data supplied from the battery management system 22. The power conversion system 10 charges and/or discharges the battery rack 21 according to the supplied control signals or control data. When the battery rack 21 is to be charged, the power conversion system 10 charges the battery rack 21 using power from the power generation system 2 and/or the grid 3. When the battery rack 21 is to be discharged, the power conversion system 10 discharges the battery rack 21 to supply power to the power generation system 2, the grid 3, and/or the load 4.

Figure 4:
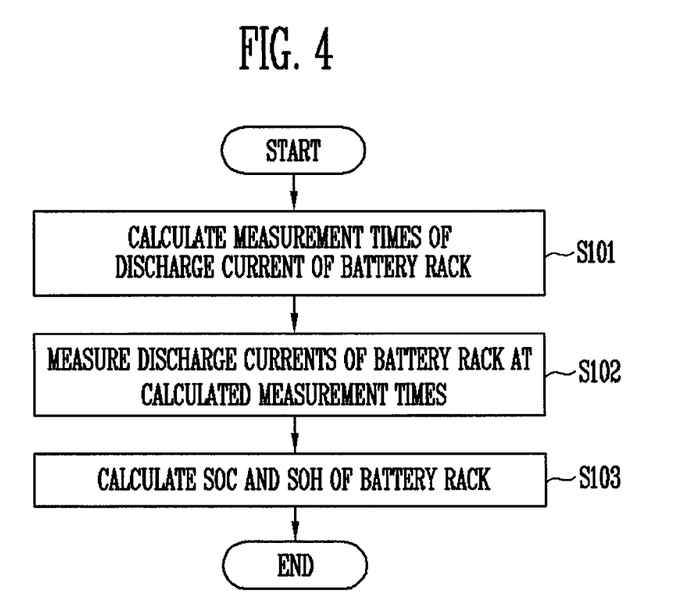
FIG. 4 is a flowchart illustrating a method for controlling charging and discharging of a battery rack by a battery management system according to an embodiment of the present invention.

FIG. 4 is a flowchart illustrating a method for controlling charging and discharging of the battery rack 21 by the battery management system 22 according to an embodiment of the present invention. This and other methods herein may be implemented, for example, as computer instructions for executing on a processor as would be apparent to one of ordinary skill. In addition, the present invention is not limited to the order of the steps presented in the methods, and in other embodiments, the order of the steps may be changed (including deleting steps or adding others).

Referring to FIG. 4, the battery management system 22 controls charging and discharging of the battery rack 21 according to steps S101 to S103. In step S101, the battery management system 22 receives discharge current of the battery rack 21 (for example, alternating discharge current at a set or predetermined frequency) from the power conversion system 10. The battery management system 22 analyzes the discharge current of the battery rack 21 (for example, through frequent sampling) and calculates current measurement times. A method of calculating the current measurement times of the battery management system 22 will be described later in conjunction with FIG. 5.

Figure 7:
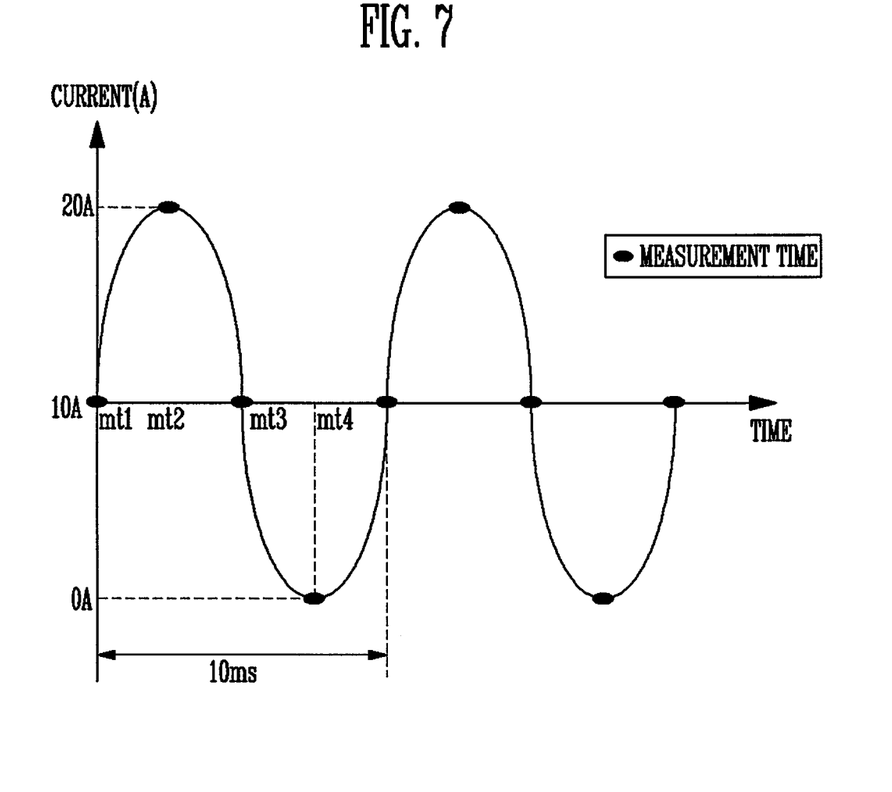
FIG. 7 is a waveform diagram illustrating measurement times of alternating discharge current calculated by the method of FIG. 5.

In step S102, the battery management system 22 measures the discharge current of the battery rack 21 at the calculated current measurement times. For example, the battery management system 22, as shown in FIG. 7, may measure the current four times over 10 ms corresponding to one period C of discharge current.

In step S103, the battery management system 22 controls the charging and discharging of the battery rack 21 based on the measured discharge current. More specifically, the battery management system 22 may calculate state of charge (SOC) and state of heath (SOH) of the battery rack 21 using the measured discharge current.

The battery management system 22 may control the charging and discharging of the battery rack 21 by controlling the power conversion system 10 based on the SOC and SOH information of the battery rack 21. For example, the battery management system 22 may generate control signals or control data, based on the SOC and SOH information of the battery rack 21, and supply the generated control signals or control data to the power conversion system 10. In this case, the power conversion system 10 charges and/or discharges the battery rack 21 according to the supplied control signals or control data.

In another embodiment, the battery management system 22 may supply, to the power conversion system 10, data including the SOC and SOH information of the battery rack 21. In this case, the power conversion system 10 charges and/or discharges the battery rack 21 based on the supplied SOC and SOH information.

As described in conjunction with FIG. 4, current measurement times are calculated by analyzing discharge current of the battery rack 21 (for example, through a set of frequent samples of the discharge current), and then the discharge current of the battery rack 21 is measured at the calculated current measurement times. As a result, when an alternating discharge current of the battery rack 21 is generated with a set or predetermined frequency, the discharge current having the frequency can be exactly measured. Accordingly, the SOC and SOH of the battery rack 21 may be exactly (or more precisely) calculated, thereby efficiently controlling the charging and discharging of the battery rack 21.

Figure 5:
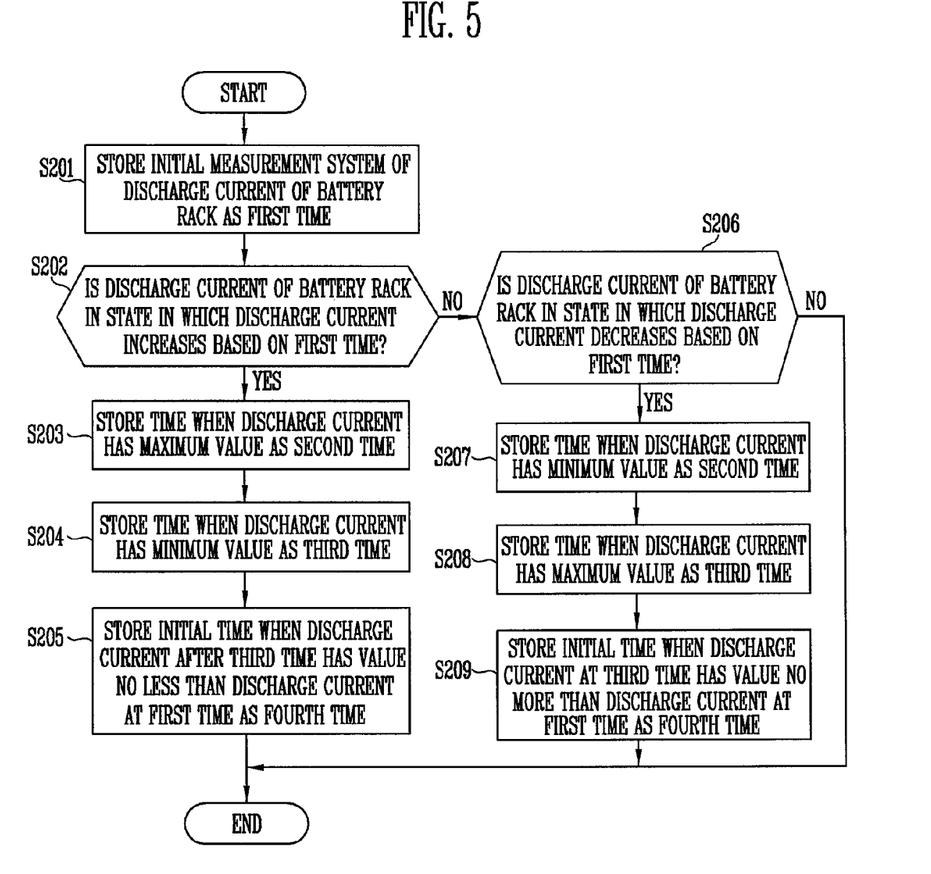
FIG. 5 is a flowchart illustrating a method for calculating current measurement times of FIG. 4.
Figure 6A:
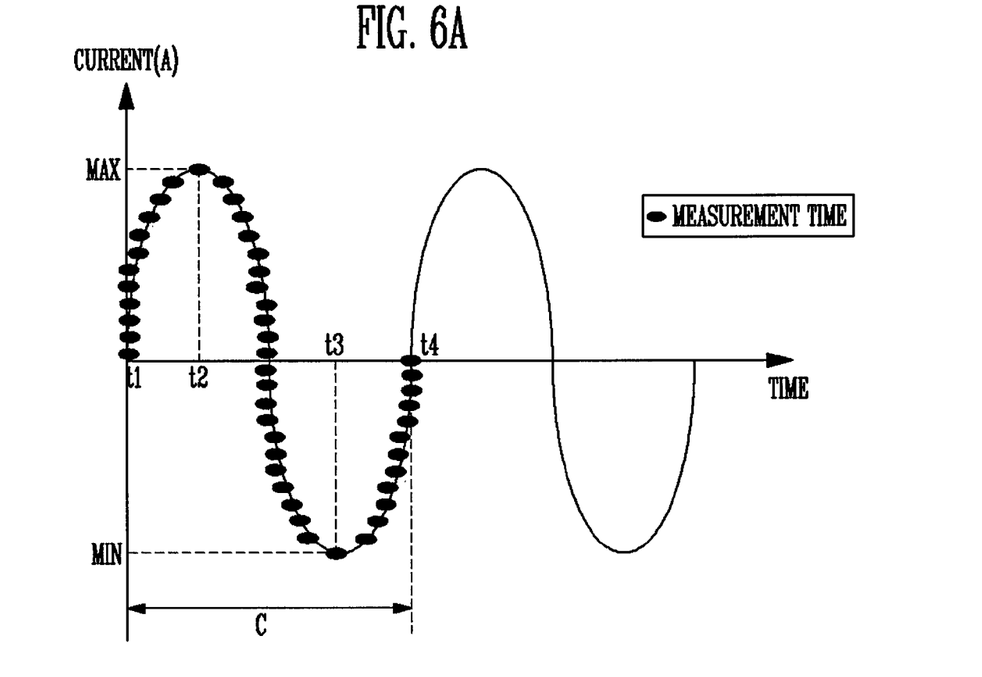
FIG. 6A is a waveform diagram illustrating an example alternating discharge current that is increasing right after a first sampling time.
Figure 6B:
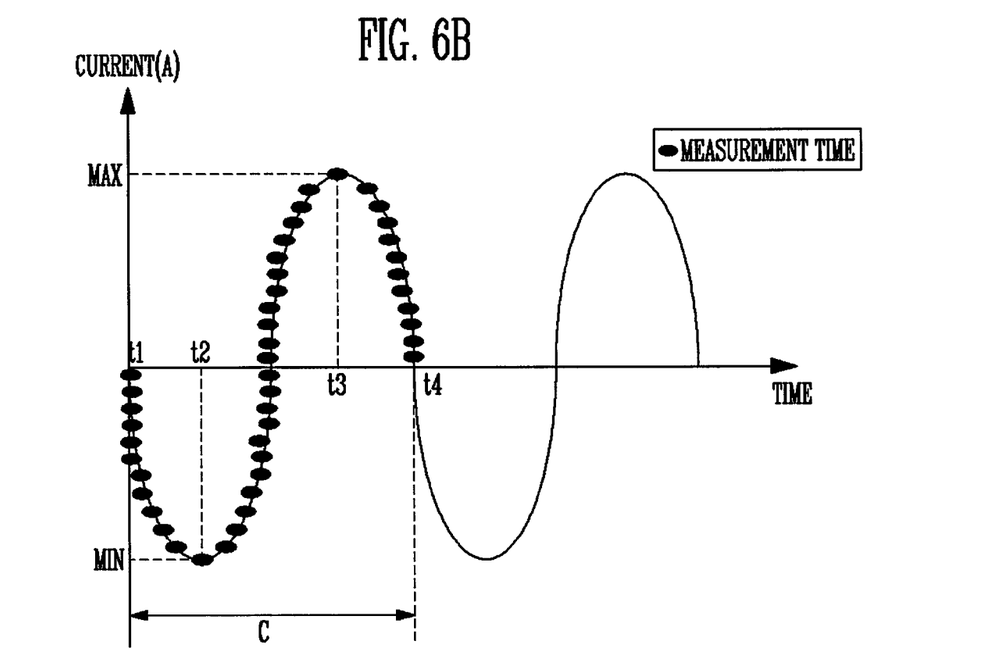
FIG. 6B is a waveform diagram illustrating an example alternating discharge current that is decreasing right after a first sampling time.

FIG. 5 is a flowchart illustrating a method for calculating the current measurement times of FIG. 4. FIG. 6A is a waveform diagram illustrating an example alternating discharge current that is increasing right after a first sampling time. FIG. 6B is a waveform diagram illustrating an example alternating discharge current that is decreasing right after a first sampling time. Hereinafter, the method for calculating the current measurement times of the battery management system 22 will be described in detail in conjunction with FIGS. 5, 6A, and 6B.

In step S201, the battery management system 22 receives discharge current of the battery rack 21 supplied from the power conversion system 10. The discharge current of the battery rack 21 may be supplied, for example, as an alternating current having a set or predetermined frequency, to the battery management system 22. The battery management system 22 stores an initial sampling time of the discharge current of the battery rack 21 as a first time t1 as shown in FIGS. 6A and 6B.

In step S202, the battery management system 22 decides whether the discharge current of the battery rack 21 is increasing as shown in FIG. 6A, right after the first time t1. For example, when the value obtained by subtracting a discharge current value measured at the first time t1 from a discharge current value measured at any one time after (such as soon after or right after, such as within a ms or small fraction of a ms, like 0.2 ms) the first time t1 is a positive number, and the absolute value of the subtracted value is at least that of a threshold value (such as a set or predefined threshold value), the battery management system 22 may decide that the discharge current of the battery rack 21 is increasing right after the first time t1.

In step S203, when the discharge current is increasing right after the first time t1, the battery management system 22 stores a time when the discharge current of the battery rack 21 first has a maximum value MAX (after the first time t1) as a second time t2 as shown in FIG. 6A (for example, through frequent sampling of the discharge current).

In step S204, the battery management system 22 stores a time when the discharge current of the battery rack 21 after the second time t2 first has a minimum value MIN as a third time t3 as shown in FIG. 6A (for example, through frequent sampling of the discharge current).

In step S205, the battery management system 22 stores an initial time (as a fourth time t4) when the discharge current value of the battery rack 21 after the third time t3 has the discharge current value or more measured at the first time t1, as shown in FIG. 6A. In this case, the length from the first time t1 to the fourth time t4 corresponds to one period C of the discharge current of the battery rack 21.

Otherwise, in step S206, when the discharge current of the battery rack 21 is not increasing as shown in FIG. 6A right after the first time t1, the battery management system 22 decides whether the discharge current of the battery rack 21 is decreasing as shown in FIG. 6B right after the first time t1. For example, when the value obtained by subtracting the discharge current value measured at the first time t1 from the discharge current value measured at any one time after the first time t1 is a negative number, and the absolute value of the subtracted value is at least that of the threshold value (such as the threshold value discussed above in step S202), the battery management system 22 may decide that the discharge current of the battery rack 21 is decreasing right after the first time t1.

Otherwise, when the discharge current of the battery rack 21 is not decreasing right after the first time t1, the battery management system 22 compares a discharge current value measured at another time after the first time t1 with the discharge current value measured at the first time t1. When it is decided that the discharge current of the battery rack 21 is neither increasing nor decreasing when the discharge current value measured at another time after the first time t1 is compared with the discharge current measured at the first time t1, the battery management system 22 may decide that the discharge current of the battery rack 21 is supplied as DC (direct) current.

In step S207, when the discharge current of the battery rack 21 is decreasing right after the first time t1, the battery management system 22 stores a time when the discharge current of the battery rack 21 first has a minimum value MIN (after the first time t1) as a second time t2 as shown in FIG. 6B (for example, through frequent sampling of the discharge current).

In step S208, the battery management system 22 stores a time when the discharge current of the battery rack 21 first has a maximum value MAX after the second time t2 as the third time t3 as shown in FIG. 6B (for example, through frequent sampling of the discharge current).

In step S209, the battery management system 22 stores an initial time (as a fourth) time t4 when the discharge current of the battery rack 21 after the third time t3 has the discharge current value or less measured at the first time t1, as shown in FIG. 6B. In this case, the length from the first time t1 to the fourth time t4 corresponds to one period C of the discharge current of the battery rack 21.

The battery management system 22 may calculate the one period C of the discharge current of the battery rack 21 using the first to fourth times t1 to t4. The battery management system 22, as shown in FIG. 7, may calculate measurement times of the discharge current of the battery rack 21 using the first to fourth times t1 to t4 and the one period C.

FIG. 7 is a waveform diagram illustrating measurement times of alternating discharge current calculated by the method of FIG. 5.

Referring to FIG. 7, the battery management system 22 measures the discharge current at measurement times calculated using the first to fourth times t1 to t4 and the one period C. For example, the battery management system 22, as shown in FIG. 7, may measure discharge currents at first to fourth measurement times mt1 to mt4. In this case, the battery management system 22 may measure the discharge current of the battery rack 21 as (10 A+20 A+0 A+10 A)/4=10 A. That is, the discharge current shown in FIG. 7 is 10 A, and thus, the battery management system 22 can exactly measure the discharge current of the battery rack without any deviation or error.

As described above, according to embodiments of the present invention, current measurement times are calculated by analyzing discharge current of the battery rack 21, and the discharge current of the battery rack 21 is measured at the calculated current measurement times. As a result, when the discharge current of the battery rack 21 is generated as an alternating current having a set or predetermined frequency, it is possible to exactly (or more precisely) measure the discharge current having the frequency. Accordingly, in embodiments of the present invention, it is possible to exactly (or more precisely) calculate the SOC and SOH of the battery rack 21, thereby efficiently controlling the charging and discharging of the battery rack 21.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. An energy storage system comprising:
   a battery rack;
   a battery management system configured to control charging and discharging of the battery rack; and
   a power conversion system configured to supply discharge current of the battery rack as an alternating current having a frequency to the battery management system,
   wherein the battery management system is further configured to calculate measurement times of the discharge current, measure the discharge current at the calculated measurement times, and control the charging and discharging of the battery rack based on the measured discharge currents.

2. The energy storage system of claim 1, wherein the battery management system is further configured to store an initial sampling time as a first time, and decide whether the discharge current of the battery rack is increasing or decreasing right after the first time.

3. The energy storage system of claim 2, wherein, when the discharge current of the battery rack is increasing right after the first time, the battery management system is further configured to store an initial time when the discharge current has a maximum value after the first time as a second time, store an initial time when the discharge current has a minimum value after the second time as a third time, and store an initial time after the third time, when the discharge current has a value no less than the discharge current measured at the first time, as a fourth time.

4. The energy storage system of claim 3, wherein the battery management system is further configured to calculate a length from the first time to the fourth time as one period length of the discharge current, and calculate the measurement times of the discharge current using the first to fourth times and the one period length.

5. The energy storage system of claim 2, wherein, when the discharge current of the battery rack is decreasing right after the first time, the battery management system is further configured to store an initial time when the discharge current has a minimum value after the first time as a second time, store an initial time when the discharge current has a maximum value after the second time as a third time, and store an initial time after the third time, when the discharge current has a value no more than the discharge current measured at the first time, as a fourth time.

6. The energy storage system of claim 5, wherein the battery management system is further configured to calculate a length from the first time to the fourth time as one period length of the discharge current, and calculate the measurement times of the discharge current using the first to fourth times and the one period length.

7. The energy storage system of claim 1, wherein the battery management system is further configured to calculate state of charge (SOC) and state of health (SOH) information of the battery rack using the measured discharge currents, generate control signals or control data based on the calculated SOC and SOH information of the battery rack, and supply the generated control signals or control data to the power conversion system.

8. The energy storage system of claim 7, wherein the power conversion system is further configured to charge and discharge the battery rack based on the supplied control signals or control data.

9. A method for driving an energy storage system, the method comprising:
   supplying discharge current of a battery rack as an alternating current having a frequency; and
   controlling charging and discharging of the battery rack depending on the discharge current,
   wherein the controlling of the charging and discharging of the battery rack depending on the discharge current comprises:
      calculating measurement times of the discharge current;
      measuring the discharge current at the measurement times; and
      controlling the charging and discharging of the battery rack based on the measured discharge currents.

10. The method of claim 9, wherein the calculating of the measurement times of the discharge current comprises:

storing an initial sampling time of the discharge current as a first time; and deciding whether the discharge current of the battery rack is increasing or decreasing right after the first time.

11. The method of claim 10, wherein, when the discharge current is increasing right after the first time, the calculating of the measurement times of the discharge current further comprises storing an initial time when the discharge current has a maximum value after the first time as a second time, storing an initial time when the discharge current has a minimum value after the second time as a third time, and storing an initial time after the third time, when the discharge current has a value no less than the discharge current measured at the first time, as a fourth time.

12. The method of claim 11, wherein the calculating of the measurement times of the discharge current further comprises calculating a length from the first time to the fourth time as one period length of the discharge current, and calculating the measurement times of the discharge current using the first to fourth times and the one period length.

13. The method of claim 10, wherein, when the discharge current is decreasing right after the first time, the calculating of the measurement times of the discharge current further comprises storing an initial time when the discharge current has a minimum value after the first time as a second time, storing an initial time when the discharge current has a maximum value after the second time as a third time, and storing an initial time after the third time, when the discharge current has a value no more than the discharge current measured at the first time, as a fourth time.

14. The method of claim 13, wherein the calculating of the measurement times of the discharge current further comprises calculating a length from the first time to the fourth time as one period length of the discharge current, and calculating the measurement times of the discharge current using the first to fourth times and the one period length.

15. The method of claim 9, wherein the controlling of the charging and discharging of the battery rack based on the measured discharge currents comprises calculating state of charge (SOC) and state of health (SOH) information of the battery rack using the measured discharge currents, generating control signals or control data based on the calculated SOC and SOH information of the battery rack, and supplying the generated control signals or control data to a power conversion system.

16. The method of claim 15, wherein the supplying of the discharge current of the battery rack comprises charging and discharging the battery rack based on the supplied control signals or control data.

* * * * *